US010025428B2

(12) United States Patent
Khazeni et al.

(10) Patent No.: US 10,025,428 B2
(45) Date of Patent: Jul. 17, 2018

(54) METHOD AND APPARATUS FOR IMPROVING CAPACITIVE SENSING DETECTION

(71) Applicant: SYNAPTICS INCORPORATED, San Jose, CA (US)

(72) Inventors: Kasra Khazeni, San Jose, CA (US); Damien Berget, Sunnyvale, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 86 days.

(21) Appl. No.: 14/946,746

(22) Filed: Nov. 19, 2015

(65) Prior Publication Data
US 2017/0147141 A1 May 25, 2017

(51) Int. Cl.
G06F 3/041 (2006.01)
G06F 3/044 (2006.01)

(52) U.S. Cl.
CPC .......... G06F 3/0418 (2013.01); G06F 3/044 (2013.01); G06F 2203/04104 (2013.01); G06F 2203/04106 (2013.01)

(58) Field of Classification Search
CPC ...... G06F 3/041; G06F 3/0412; G06F 3/0416; G06F 3/0418; G06F 3/044; G06F 2203/04104; G06F 2203/04106
See application file for complete search history.

(56) References Cited

U.S. PATENT DOCUMENTS

| 4,170,025 A | 10/1979 | Benkley et al. |
| 4,459,541 A | 7/1984 | Fielden et al. |
| 4,733,222 A | 3/1988 | Evans |
| 4,974,236 A | 11/1990 | Gurcan et al. |

(Continued)

FOREIGN PATENT DOCUMENTS

| EP | 0749086 A1 | 12/1996 |
| EP | 1624399 A1 | 2/2006 |

(Continued)

OTHER PUBLICATIONS https://en.wikipedia.org/wiki/Invertible_matrix, "Invertible Matrix", 10 pages.

(Continued)

Primary Examiner — Nathan Danielsen
(74) Attorney, Agent, or Firm — Patterson + Sheridan, LLP

(57) ABSTRACT

Embodiments of the disclosure provided herein provide a device and method of using the device that is able to improve the detection of user input provided to an input device while one or more sources of noise are present during the detection process. One or more of the embodiments disclosed herein may include a scanning process and a signal processing technique that is able to more reliably detect the presence and position of an input object by reducing the effect of noise on a resulting signal that is generated during a capacitive sensing process. In some configurations, the scanning and signal processing techniques disclosed herein can be improved by increasing a capacitive sensing device's ability to detect the presence of an input object by improving the signal-to-noise ratio of the data collected during a capacitive sensing process.

21 Claims, 12 Drawing Sheets

(56) References Cited

U.S. PATENT DOCUMENTS

| | | |
|---|---|---|
| 5,304,937 A | 4/1994 | Meyer |
| 5,305,017 A | 4/1994 | Gerpheide |
| 5,648,642 A | 7/1997 | Miller et al. |
| 5,666,113 A | 9/1997 | Logan |
| 5,787,126 A | 7/1998 | Itoh et al. |
| 5,790,106 A | 8/1998 | Hirano et al. |
| 5,825,352 A | 10/1998 | Bisset et al. |
| 5,841,078 A | 11/1998 | Miller et al. |
| 5,861,875 A | 1/1999 | Gerpheide |
| 5,880,411 A | 3/1999 | Gillespie et al. |
| 5,917,906 A | 6/1999 | Thornton |
| 5,940,526 A | 8/1999 | Setlak et al. |
| 5,963,679 A | 10/1999 | Setlak |
| 6,067,368 A | 5/2000 | Setlak et al. |
| 6,259,804 B1 | 7/2001 | Setlak et al. |
| 6,392,167 B1 | 5/2002 | Nakagawa |
| 6,570,557 B1 | 5/2003 | Westerman et al. |
| 6,621,487 B2 | 9/2003 | Iwasaki et al. |
| 6,704,005 B2 | 3/2004 | Kato et al. |
| 6,771,280 B2 | 8/2004 | Fujisaki et al. |
| 6,788,288 B2 | 9/2004 | Ano |
| 7,075,316 B2 | 7/2006 | Umeda et al. |
| 7,078,918 B2 | 7/2006 | Umeda et al. |
| 7,084,645 B1 | 8/2006 | Umeda et al. |
| 7,106,720 B2 | 9/2006 | Ozluturk et al. |
| 7,292,229 B2 | 11/2007 | Morag et al. |
| 7,372,455 B2 | 5/2008 | Perski et al. |
| 7,451,050 B2 | 11/2008 | Hargreaves |
| 7,616,786 B2 | 11/2009 | Setlak |
| 8,338,724 B2 | 12/2012 | Reynolds |
| 8,591,279 B1 | 11/2013 | Cok et al. |
| 8,766,950 B1 | 7/2014 | Morein et al. |
| 8,970,537 B1 | 3/2015 | Shepelev et al. |
| 8,970,547 B2 | 3/2015 | Sabo et al. |
| 2002/0049070 A1 | 4/2002 | Bick |
| 2002/0050983 A1 | 5/2002 | Liu et al. |
| 2002/0173337 A1 | 11/2002 | Hajimiri et al. |
| 2002/0185981 A1 | 12/2002 | Dietz et al. |
| 2003/0030628 A1 | 2/2003 | Sato et al. |
| 2003/0035570 A1 | 2/2003 | Benkley |
| 2003/0067449 A1 | 4/2003 | Yoshikawa et al. |
| 2003/0076306 A1 | 4/2003 | Zadesky et al. |
| 2003/0133432 A1 | 7/2003 | Moerder |
| 2004/0056785 A1 | 3/2004 | Webster et al. |
| 2004/0056849 A1 | 3/2004 | Lohbihler et al. |
| 2004/0081339 A1 | 4/2004 | Benkley |
| 2005/0005703 A1 | 1/2005 | Saito et al. |
| 2005/0024065 A1 | 2/2005 | Umeda et al. |
| 2005/0052425 A1 | 3/2005 | Zadesky et al. |
| 2005/0073324 A1 | 4/2005 | Umeda et al. |
| 2005/0122785 A1 | 6/2005 | Umeda et al. |
| 2005/0150697 A1 | 7/2005 | Altman et al. |
| 2006/0293017 A1 | 12/2006 | Kim et al. |
| 2007/0047669 A1 | 3/2007 | Mak et al. |
| 2007/0062852 A1 | 3/2007 | Zachut et al. |
| 2007/0109274 A1 | 5/2007 | Reynolds |
| 2008/0192018 A1 | 8/2008 | Park et al. |
| 2009/0135973 A1 | 5/2009 | He |
| 2009/0143031 A1 | 6/2009 | Shah |
| 2009/0315570 A1 | 12/2009 | Chappell et al. |
| 2009/0322351 A1 | 12/2009 | McLeod |
| 2009/0322578 A1 | 12/2009 | Petrovic |
| 2010/0060589 A1 | 3/2010 | Wilson |
| 2010/0090712 A1* | 4/2010 | Vandermeijden ..... G06F 3/0416 324/658 |
| 2010/0110037 A1 | 5/2010 | Huang et al. |
| 2010/0156791 A1 | 6/2010 | Hsu et al. |
| 2010/0159858 A1 | 6/2010 | Dent et al. |
| 2010/0189197 A1 | 7/2010 | Nakatani |
| 2010/0321307 A1 | 12/2010 | Hirokawa |
| 2011/0063993 A1 | 3/2011 | Wilson et al. |
| 2011/0134069 A1 | 6/2011 | Shen |
| 2011/0267305 A1* | 11/2011 | Shahparnia ........... G06F 3/0412 345/174 |
| 2011/0273378 A1 | 11/2011 | Alameh et al. |
| 2011/0285640 A1 | 11/2011 | Park et al. |
| 2012/0038585 A1 | 2/2012 | Kim |
| 2012/0044176 A1 | 2/2012 | Nakamura et al. |
| 2012/0068949 A1 | 3/2012 | Washburn et al. |
| 2012/0068966 A1 | 3/2012 | Washburn et al. |
| 2012/0206407 A1* | 8/2012 | Taylor .................... G06F 3/044 345/174 |
| 2012/0313901 A1 | 12/2012 | Monson |
| 2013/0044074 A1 | 2/2013 | Park et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0257773 A1 | 10/2013 | Shih et al. |
| 2013/0321296 A1 | 12/2013 | Lee et al. |
| 2014/0225856 A1 | 8/2014 | Shepelev et al. |
| 2015/0054752 A1* | 2/2015 | Mackey ................. G06F 3/044 345/173 |
| 2015/0091851 A1 | 4/2015 | Reynolds |
| 2015/0109213 A1* | 4/2015 | Yao ....................... G06F 3/044 345/173 |

FOREIGN PATENT DOCUMENTS

| | | |
|---|---|---|
| JP | 2003022158 A | 1/2003 |
| JP | 2005098789 A | 4/2005 |
| JP | 2005114362 A | 4/2005 |
| KR | 20080075611 A | 8/2008 |
| KR | 20100042761 A | 4/2010 |
| WO | 2004107146 A2 | 12/2004 |
| WO | 2002047018 | 6/2013 |

OTHER PUBLICATIONS

U.S. Appl. No. 15/612,250, filed Jun. 2, 2017.
U.S. Appl. No. 15/406,109, filed Jan. 13, 2017.

* cited by examiner

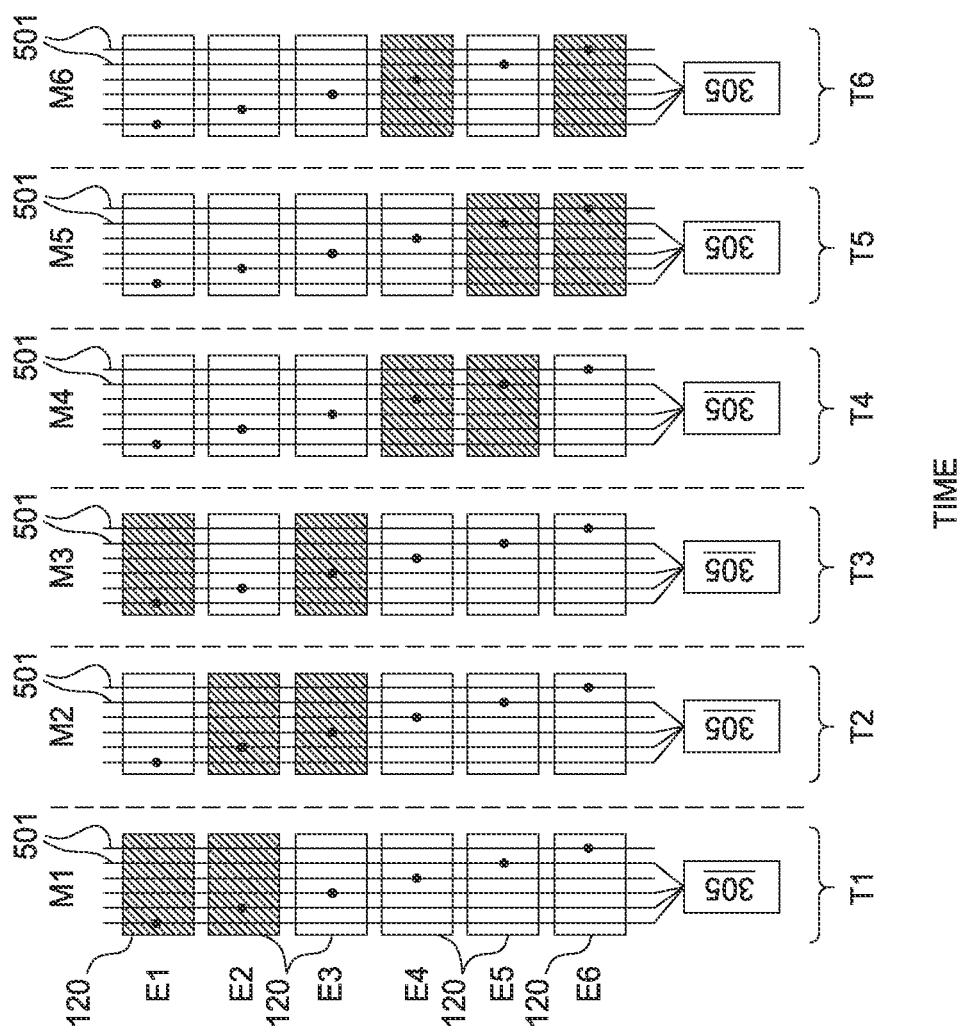

METHOD AND APPARATUS FOR IMPROVING CAPACITIVE SENSING DETECTION

BACKGROUND OF THE INVENTION

Field of the Invention

Embodiments of the present invention generally relate to a method and apparatus for touch sensing, and more specifically, an improved absolute sensing device and methods for using the same.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrodes. Some capacitive implementations utilize "self capacitance" (or "absolute capacitance") sensing methods based on changes in the capacitive coupling between sensor electrodes and an input object. In various configurations, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. Absolute capacitance sensing methods are very effective in detecting the presence of a single input object, even when positioned far from the surface of the proximity sensor device, while still accurately detecting the contact of an input object with the proximity sensor surface.

Other capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of a resulting signal. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit transmitter signals and receive resulting signals. Transcapacitive sensing methods are very effective in detecting the presence of a multiple input objects in a sensing region and input objects that are in motion. However, transcapacitive sensing methods generally rely on compact electric fields which are not very effective for detecting the presence or approach of objects spaced from the surface of the proximity sensor device. Transcapactive sensing methods typically rely on multiple transmitter electrodes in an array perpendicular to an array of receiver electrodes to form a capacitive image array.

While proximity sensor devices have been in use for several years, engineers continue to seek design alternatives and methods of using these devices that reduce costs and/or improve sensor performance. In particular, significant attention has been paid in recent years to reducing the effects of noise generated by display screens, power sources, electromagnetic interference, radio frequency interference and/or other sources that are positioned near and/or outside of the proximity sensor device. Numerous filtering, signal processing, shielding, and other noise-reduction techniques have been implemented with varying levels of success. Accordingly, it is desirable to provide systems and methods for quickly, effectively and efficiently detecting a position-based attribute of an object in the presence of noise.

Thus, there is a need for an improved proximity sensor device that resolves the issues discussed above.

SUMMARY

Embodiments disclosed herein may advantageously provide a device and method of using the same that is able to improve the detection of user input provided to an input device while one or more sources of noise are present during the detection process. The improved detection process includes increasing the number of resulting signals that are measured from each sensor electrode during a single cycle of a cyclical scanning process without increasing the system cost and complexity.

Embodiments of the disclosure may further provided a method of detecting the position of an input object within a sensing region of an input device, comprising generating composite resulting signals from combination of resulting signal received from two or more sensor electrodes, where the composite resulting signal are independent (e.g., substantially orthogonal) of each other. In one embodiment, a method of detecting the position of an input object within a sensing region of an input device comprises generating a first composite resulting signal, wherein the first composite resulting signal comprises a combination of capacitive sensing measurements received from two or more sensor electrodes in a first scanned group of sensor electrodes in an array of sensor electrodes, and generating a second composite resulting signal, wherein the second composite resulting signal comprises a combination of capacitive sensing measurements received from two or more sensor electrodes in a second scanned group of sensor electrodes in the array of sensor electrodes. Then analyzing at least the first composite resulting signal and the second composite resulting signal to determine a substantially independent resulting signal value (e.g. orthogonal) from each of the sensor electrodes in the array of sensor electrodes.

Embodiments of the disclosure may further provided a method of detecting the position of an input object within a sensing region of an input device, comprising calculating a resulting signal for each sensor electrode in a first array of sensor electrodes, wherein calculating the resulting signal includes generating a first composite resulting signal, wherein the first composite resulting signal includes a combination of capacitive sensing measurements received from two or more sensor electrodes in a first scanned group of sensor electrodes in the first array of sensor electrodes, and generating a second composite resulting signal, wherein the second composite resulting signal includes a combination of capacitive sensing measurements received from two or more sensor electrodes in a second scanned group of sensor electrodes in the first array of sensor electrodes. Also, calculating a resulting signal for each sensor electrode in a second array of sensor electrodes, wherein calculating the resulting signal includes generating a third composite resulting signal, wherein the third composite resulting signal includes a combination of capacitive sensing measurements received from two or more sensor electrodes in a third scanned group of sensor electrodes in the second array of sensor electrodes, and generating a fourth composite resulting signal, wherein the fourth composite resulting signal includes a combination of capacitive sensing measurements received from two or more sensor electrodes in a fourth scanned group of sensor electrodes in the second array of sensor electrodes. Then analyzing the first composite resulting signal and the second composite resulting signal to determine a resulting signal value from each of the sensor electrodes in the first array of sensor electrodes, and analyzing the third composite resulting signal and the fourth composite resulting signal to determine a resulting signal value from each of the sensor electrodes in the second array of sensor electrodes. Then combining the calculated resulting signal for each sensor electrode in the first array and the second array to form at least part of a capacitive image of the sensing region of the input device.

Embodiments of the disclosure may further provided an input device, comprising a processor, and a non-transitory memory having stored therein a number of instructions which, when executed by the processor, causes the electronic device to perform operations comprising generating a first composite resulting signal, wherein the first composite resulting signal comprises a combination of capacitive sensing measurements received from two or more sensor electrodes in a first scanned group of sensor electrodes in an array of sensor electrodes, generating a second composite resulting signal, wherein the second composite resulting signal comprises a combination of capacitive sensing measurements received from two or more sensor electrodes in a second scanned group of sensor electrodes in the array of sensor electrodes, and analyzing the first composite resulting signal and the second composite resulting signal to determine a resulting signal value from each of the sensor electrodes in the array of sensor electrodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B illustrates a capacitive sensing scanning process performed on a linear array of sensor electrodes over a number of time intervals.

Figure 1:
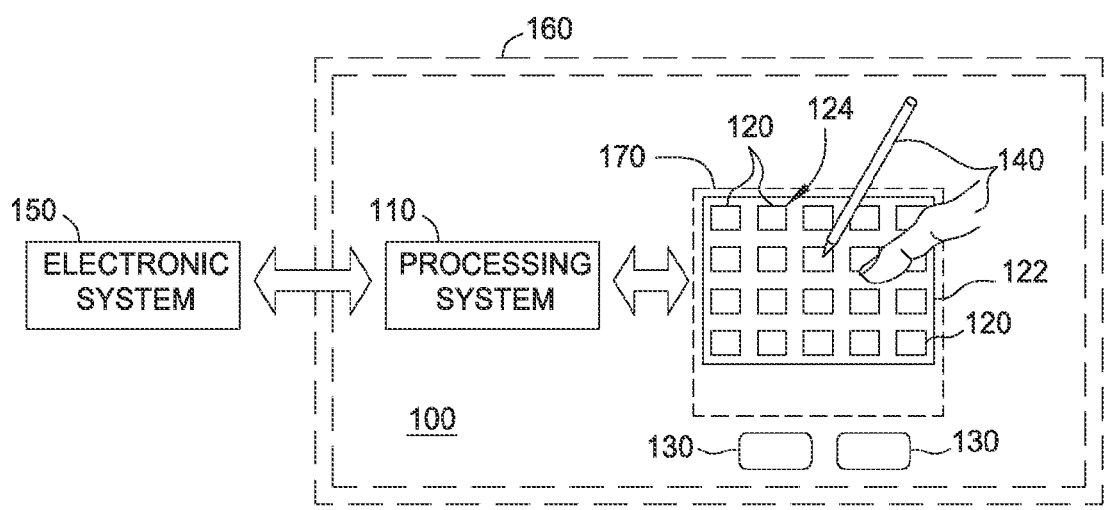
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the disclosure provided herein include input devices and methods for improving usability of an input device. Particularly, embodiments described herein advantageously provide a device and method of using the same that is able to improve the detection of user input provided to an input device while one or more sources of noise are present during the detection process. One or more of the embodiments disclosed herein may include a scanning process and a signal processing technique that is able to more reliably detect the presence and position of an input object by processing received resulting signals that are generated during a capacitive sensing process to reducing the effect of noise on the detection process (e.g. finger coupled interference, internal sensor noise, power supply coupled interference, etc.). In some configurations, the scanning and signal processing techniques disclosed herein can be improved by increasing a capacitive sensing device's ability to detect the presence of an input object by improving the signal-to-noise ratio of the data collected during a capacitive sensing process. For example, some techniques include carrier signal modulation to provide a narrow band signal and ability to shift the carrier signal to a frequency with lower interference.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from the surface of the input device 100 in one or more directions into the space above or below the surface until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120, and may optionally include one or more grid electrodes 122. As several non-limiting examples, the input device 100 may use capacitive, elastive, resistive, inductive, magnetic acoustic, ultrasonic, and/or optical techniques. In some embodiments, modulated input (e.g. an active stylus) of a known frequency may be distinguished from interference and the input device may determine the position and/or digital data transferred by the modulated input to the input device (e.g. force, button states, tilts, battery status, etc.).

Some implementations are configured to provide images that span one, two, three, or higher dimensional spaces. Some implementations are configured to provide projections of input along particular axes or planes. Such projections may be used to determine positional information about input objects in the sensing region.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive type sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation of a carrier signal or other signal conditioning. In various embodiments, the processing system 110 generates a capacitive image directly from the resulting signals received with sensing elements 124 (e.g., sensor electrodes 120). In other embodiments, processing system 110 spatially filters (e.g., taking a difference, weighted sum of neighboring elements) the resulting signals received with sensing elements 124 (e.g., sensor electrodes 120) to generate a sharpened or averaged image. As yet another example, the processing system 110 may subtract or otherwise account for a baseline, such that the information reflects a difference between the electrical signals and the baseline. The baseline may be generated and adjusted to estimate the electrical signals received when no user input is present on or near the sensor (e.g. a snap-shot at start up, filtering the resulting signals, tracking thermal variations) throughout the operation of the electric device and the processing system. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities above and below the surface of the sensor. Further examples include other representations of spatial information. Historical data regarding one or more types of positional information may also be determined and/or stored, including, for example, historical data that tracks position, motion, or instantaneous velocity over time. Such information may be reported to a host system to affect a user interface (UI) presented to the user.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate, anode, cathode, and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
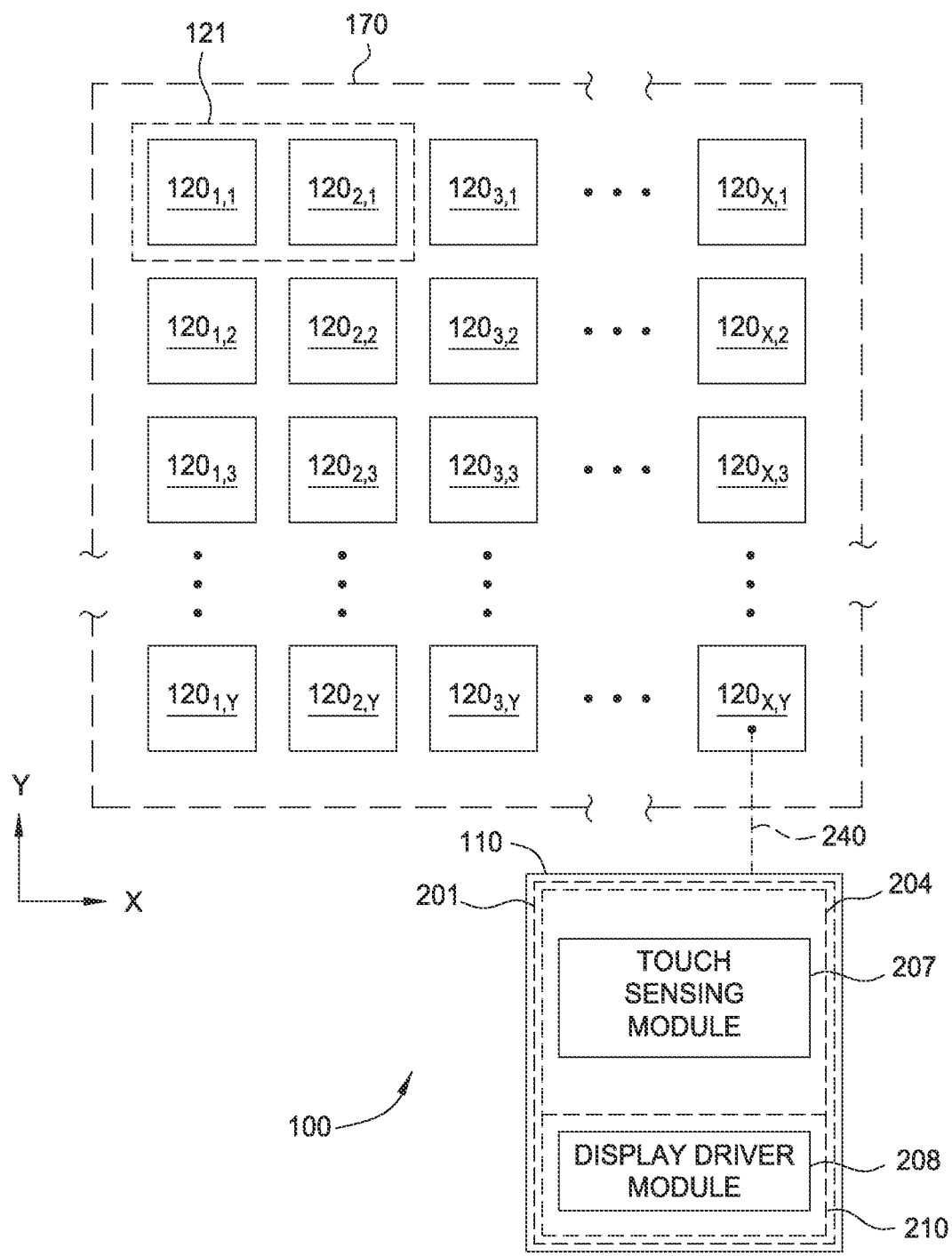
FIG. 2 illustrates a simplified exemplary array of sensor elements that may be used in the input device of FIG. 1.

FIG. 2 is a schematic block diagram of a portion of the input device 100 illustrated in FIG. 1 in accordance with the disclosure provided herein. The illustrated portion of the input device 100 includes an array of sensing electrodes sensing elements 124, such as sensor electrodes 120, that are coupled to an integrated control system 201 that is formed within the processing system 110 via a connection 240. While the discussion below primarily uses sensor electrodes 120 as an example of the sensing elements 124 this configuration is not intended to limiting as to the scope of the disclosure provided herein.

FIG. 2 illustrates a portion of an exemplary pattern of sensor electrodes 120 configured to sense in the sensing region 170 associated with the pattern, according to some embodiments. For clarity of illustration and description, the sensor electrodes 120 are illustrated in a pattern of simple rectangles and do not show various other components. The exemplary pattern comprises an array of sensor electrodes $120_{X,Y}$ (referred collectively as sensor electrodes 120 or as a full-array of sensor electrodes) arranged in X columns and Y rows, wherein X and Y are positive integers. It is contemplated that the pattern of sensor electrodes 120 may comprises a plurality of sensor electrodes 120 having other configurations, such as polar arrays, repeating patterns, hexagonal arrays, non-repeating patterns, non-uniform arrays, a single row or column, or other suitable arrangement. Further, the sensor electrodes 120 may be any shape such as circular, rectangular, diamond, star, square, non-convex, convex, non-concave, concave, etc. The sensor electrodes 120 are coupled to the processing system 110 and utilized to determine the presence (or lack thereof) of an input object 140 in the sensing region 170. The sensor electrodes 120 are typically ohmically isolated from each other. That is, one or more insulators separate the sensor electrodes 120 and prevent them from electrically shorting to each other.

In one mode of operation, or first operation mode, at least a portion of the arrangement of sensor electrodes 120 (e.g., sensor electrodes $120_{1-1}$, $120_{1-2}$, $120_{1-3}$, ... $120_{X-Y}$) may be utilized to detect the presence of an input object via absolute sensing techniques. That is, processing system 110 is configured to drive each sensor electrode 120 with a modulated signal and measure a capacitance between the sensor electrode 120 and the input object (e.g., free space or earth ground) based on the modulated signal, which is utilized by the processing system 110 or other processor to determine the position of the input object.

In another mode of operation, or second operation mode, at least a portion the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal includes effects corresponding to the transmitter signal. The resulting signal is utilized by the processing system 110 or other processor to determine the position of the input object. The groups of sensor electrodes 120 thus form a plurality of sensing elements 121 that comprises one or more transmitter electrodes and one or more receiver electrodes that can be disposed within one or more layers of the display device 160. For clarity of drawing reasons, only one example of a sensing element 121 is illustrated in FIG. 2. For example, diagonal or checker-board pattern is used. In one configuration of the display device 160, each of the sensing elements 121 comprise one or more transmitter electrodes that are disposed proximate to one or more receiver electrodes. In one example, a transcapacitive sensing method using the single layer sensor electrode design, may operate by detecting the change in capacitive coupling between one or more of the driven transmitter sensor electrodes and one or more of the receiver electrodes, as similarly discussed above.

The input device 100 may be configured to operate in any one of the modes described above. The input device 100 may also be configured to switch operation between any two or more of the modes described above.

The areas of localized detection areas (capacitive sensing areas) may be termed "capacitive pixels." Capacitive pixels may be formed between an individual sensor electrode 120 within a sensing element 121 and ground in the first mode of operation and between groups of sensor electrodes 120 within a sensing element 121 used as transmitter and receiver electrodes in the second mode of operation. The capacitive coupling changes with the proximity and motion of input objects 140 in the sensing region 170 associated with the sensing elements 121, and thus may be used as an indicator of the presence of the input object in the sensing region of the input device 100. A set of measurements from the capacitive pixels form a "capacitive image" (also "capacitive frame") representative of the capacitive couplings at the pixels.

In some embodiments, the sensor electrodes 120 are "scanned" to determine these capacitive couplings. That is, in one embodiment, in a particular time interval one subset of the sensor electrodes 120 is driven, and in a different time interval a second subset of the sensor electrodes 120 is driven. In the second mode of operation, the transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. Additionally, the sensor electrodes may be segmented such that they are ohmically isolated, yet form a single effective electrode across the sensing region. In such embodiments, the receiver electrodes may be segmented to form a receiver electrode gird or the transmitter electrodes may be segmented to form a transmitter electrode grid.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive couplings comprises driving with a modulated signal and measuring the absolute capacitance of one or more of the sensor electrodes. In another embodiment, the sensor electrodes may be operated such that more than one sensor electrode is driven at a time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven electrodes 120 in the same sensing cycle. In various embodiments, processing system 110 may configured to selectively drive and receive with a portion of sensor electrodes 120. For example, the sensor electrodes may be selected based on, but not limited to, an application running on the host processor, a status of the input device, an operating mode of the sensing device, a measurement on another sensor electrode and a determined location of an input object.

Figure 3A:
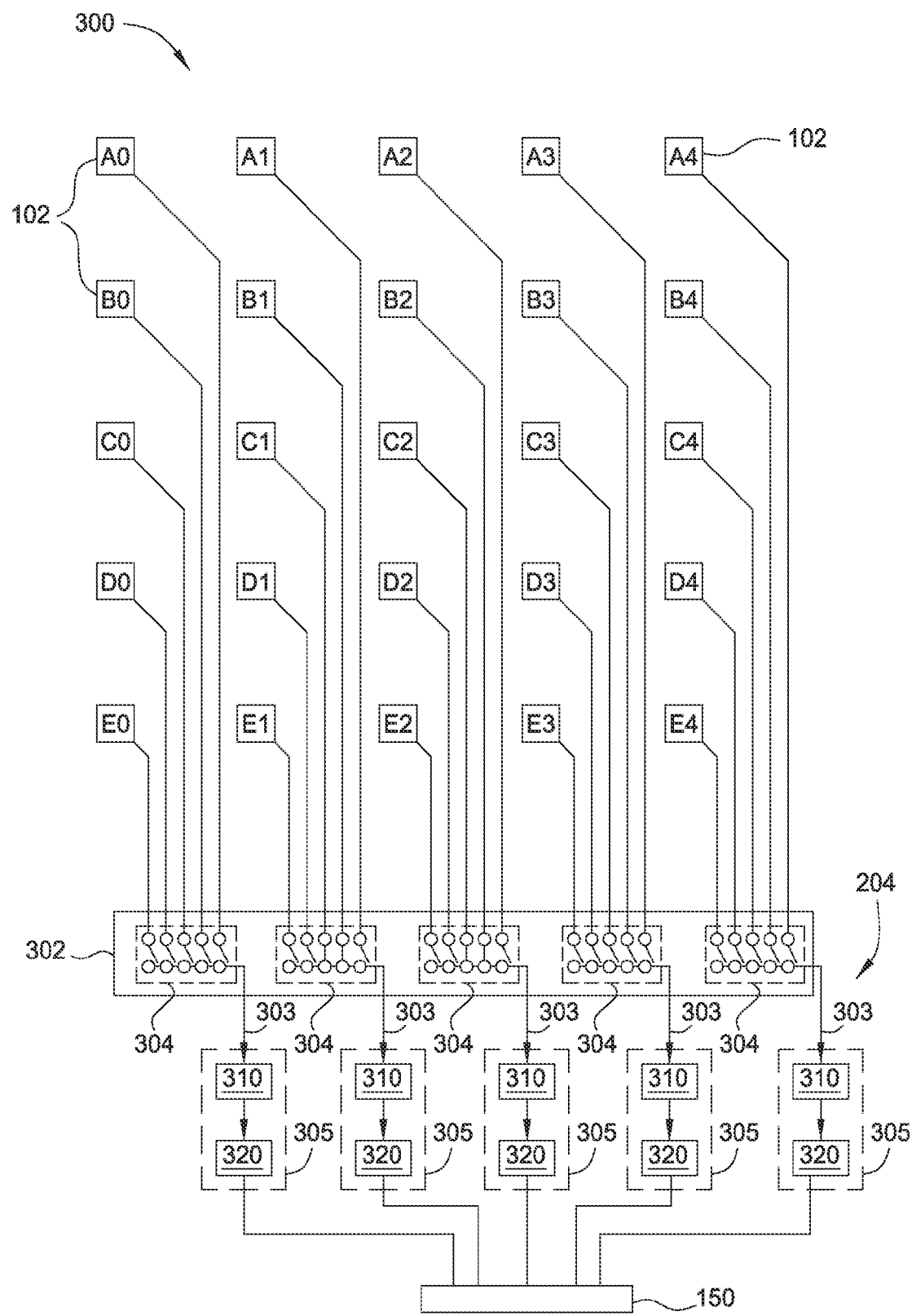
FIG. 3A illustrates a simplified array of sensor electrodes, and their associated routing traces, that are coupled to a portion of the processing system.

FIG. 3A is a simplified schematic plan view of a portion 300 of the input device comprising a plurality of sensor electrodes 120 configured to detect the position of an input object using one or a combination of the capacitive sensing modes described above, according to another embodiment of the present disclosure. The sensor electrodes 120 of the portion 300, which are identified as A0 to A4, B0 to B4, . . . , E0 to E4, are configured to be selectively coupled to one or more receiver channels 303 of the capacitive sensing circuitry 204 using a multiplexor assembly 302. The multiplexor assembly 302 may contain a plurality of multiplexors 304 that are each coupled to a set of sensor electrodes 120 (e.g., rows of sensor electrodes A0-E0, A1-E1 . . . A4-E4). While a single multiplexor assembly 302 is depicted in the example illustrated in FIG. 3A, it is recognized that more than one multiplexor may also be used, for example, in some configurations a plurality of multiplexors may be coupled in series or parallel to form at least one multiplexor assembly. The multiplexor assembly 302 may be internal to the capacitive sensing circuitry 204 of the processing system 110, or in other embodiments, external to the capacitive sensing circuitry 204 of the processing system 110, or in yet other embodiments, external to the processing system 110. In one or more embodiments, the capacitive sensing circuitry 204 selects a number of sensor electrodes 120 driven simultaneously by use of one or more of the components in each multiplexor 304 of the multiplexor assembly 302 for absolute capacitive sensing to perform one or more of the scanning processes described below. In one embodiment, each multiplexor 304 is coupled to a particular set of sensor electrodes within the sensing region 170. In the example shown in FIG. 3A, each multiplexor 304 is coupled to a group of four sensor electrodes (i.e., 4:1 ratio) which is used to detect a resulting signal received from the group of sensor electrode 120, although other arrangements are contemplated. The resulting signals received from the sensor electrodes 120 are combined by the respective multiplexors 304 into an input that is provided to the corresponding receiver module(s) 305. According to one or more embodiments, the capacitive sensing circuitry 204 is configured to programmatically join sensor electrodes 120 into groups of sensor electrode for absolute capacitive sensing by summing and delivering the resulting signal received from the sensor electrodes to the receiver module 305. In one embodiment, the currents from multiplexed inputs maybe summed by accumulating them onto filter capacitance (e.g. capacitive sensing circuitry 204).

In some embodiments, the capacitive sensing circuitry 204 includes a plurality of receiver modules 305 that are each configured to receive an input signal (e.g. a current) from each of the multiplexors 304 and deliver a signal to the electronic system 150. In various embodiments, the receiver modules 305 will include digital signal processing elements and/or other useful digital and analog circuit elements that are connected together to process the signal(s) received from the multiplexor 304, and also provide the processed signal(s) to other portions of the electronic system 150. The electronic system 150 can then use the processed signals to control some aspect of the processing system 110, such as send a message to the display, perform some calculation or software related task based on instructions created by one or more software programs that are being run by the electronic system and/or perform some other function. In some embodiments, the receiver module 305 may contain a current conveyor 310 and an analog frontend 320. This configuration may be particularly useful in cases where the number of possible sets of sensor electrodes exceeds the number of available receiver channels (e.g., analog front ends), as in the case of larger sensor patterns.

A current conveyor 310 includes electrical components configured to convert an input current into one or more scaled output currents, although other configurations or implementations of a current conveyor may be used. In some configurations, the current conveyor 310 comprises electrical components that are configured to convert an input current or voltage into one or more scaled output currents or voltages or their inverse (i.e. negative vs positive) currents or voltages. In some configurations, the current conveyor 310 comprises electrical components that are configured to route currents to opposite sides of a filter capacitance and/or to separate differential currents. In another configuration, an output of a current conveyor may be inverted by a current mirror.

In one embodiment, the analog frontend 320 comprises a receiver channel that has a first input port that is configured to receive the resulting signal received from at least one sensor electrode and current conveyor 310 and provide an output to the electronic system 150. Each of the plurality of analog frontends 320 may include a charge accumulator, filter capacitance, and other supporting components such as demodulator circuitry, a low pass filter, sample and hold circuitry, other useful electronic components, filters and analog/digital converters (ADCs) or the like. The analog/digital converter (ADC) may comprise, for example, a standard 8, 12 or 16 bit ADC or a Successive Approximation ADC, a Sigma-Delta ADC, an Algorithmic ADC, etc. that is adapted to receive an analog signal and deliver a digital signal (receiver channel output signal) to the electronic system 150. In one configuration, each charge accumulator includes an integrator type operational amplifier that has an integrating capacitance (e.g., a filter capacitance) that is coupled between the inverting input and the output of the device. The charge accumulator may also be differential in inputs and/or outputs.

Figure 3B:
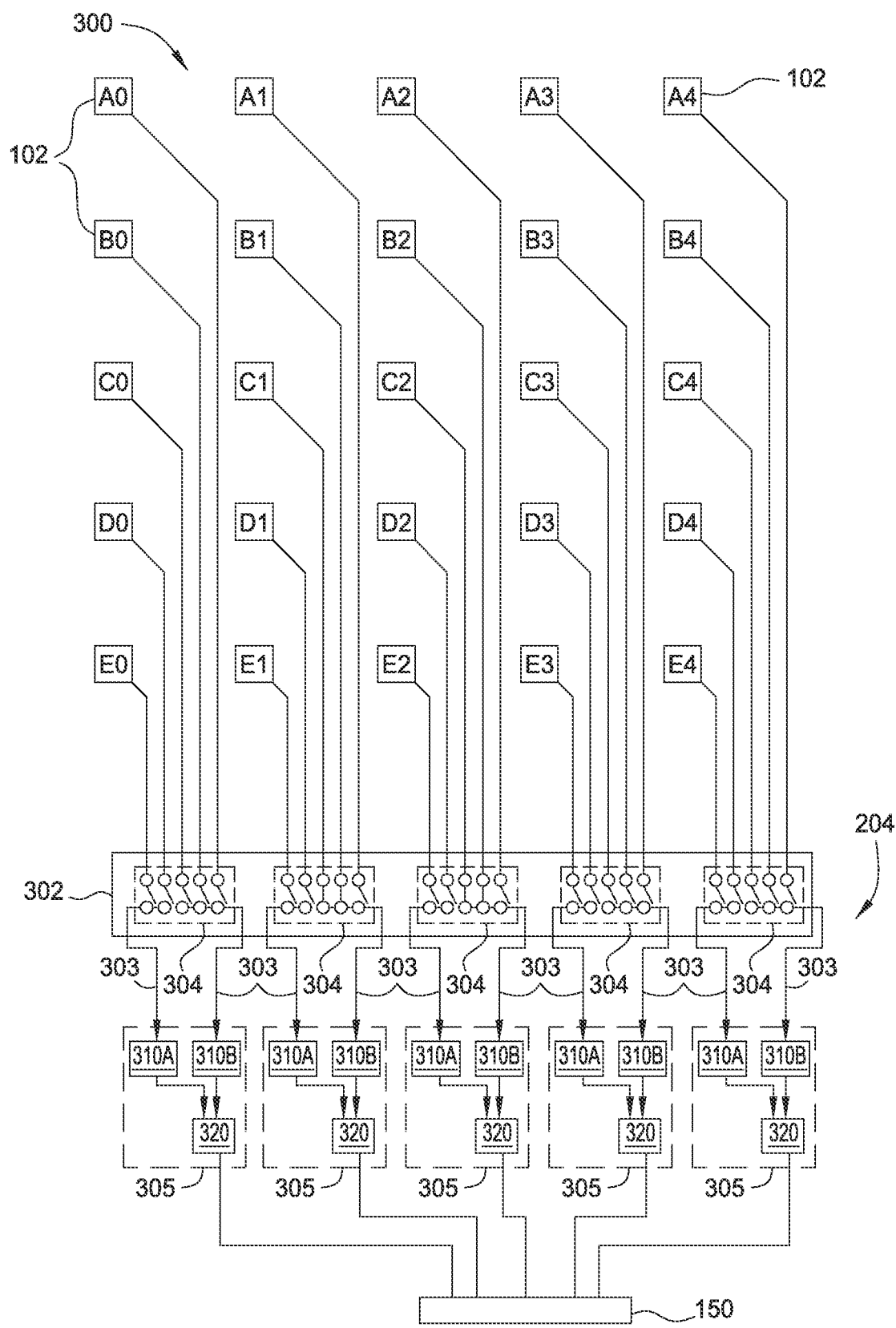
FIG. 3B illustrates another example of a simplified array of sensor electrodes, and their associated routing traces, that are coupled to a portion of the processing system.

FIG. 3B illustrates another simplified schematic plan view of a portion 300 of an input device having a plurality of sensor electrodes 120 that are configured to detect the position of an input object using one or a combination of the capacitive sensing modes described above. FIG. 3B is similar to FIG. 3A except that each of the multiplexors 304 are configured to divide up and deliver portions of the received resulting signals to two or more current conveyors that are configured to alter the received signals so that they can be used in one or more of the scanning processes described below, such as the scanning process described in conjunction with FIG. 6B. In one embodiment, the multiplexors 304 are each configured to divide up and deliver a portion of the resulting signals used to form the composite resulting signals to an inverting current conveyor 310A and deliver another portion of the resulting signals used to form a part of the composite resulting signal to a non-inverting current conveyor 310B. The signals received from the inverting current conveyor 310A and non-inverting current conveyor 310B are then delivered to the analog frontend 320 and then the electronic system 150 for use, for example, in determining the position of an input object 140 within the sensing region 170.

Signal Processing Method and Apparatus Examples

As discussed above, embodiments of the disclosure provided herein advantageously provide a device, and method of using the device, that is able to improve the detection of user input provided to an input device while one or more sources of noise are present. The device and scanning and signal processing techniques provided herein are able to more reliably detect the presence and position of an input object by reducing the effect of noise on a determined position of the input object. Embodiments of the disclosure provided herein may be useful for detecting the position of an input object using a full-array of sensing electrodes that are configured to use a capacitance sensing technique, such as an absolute capacitive sensing technique, however, this configuration is not intended to limiting as to the scope of the disclosure provided herein.

In general, the techniques disclosed herein include a process of defining an array of sensor electrodes 120 that are sequentially scanned using a defined scanning pattern, and the generated resulting signals that are detected during the sequential scanning process are then processed to more reliably determine the current position of an input object 140 over the sensing region 170. In some embodiments, the sequential scanning process includes a cyclical scanning pattern that includes the detection of resulting signals that are formed from sensing the measured capacitance from multiple sensor electrodes at one time during each of the successive scanning process time intervals. It has been found that the detection of an input object's position relative to one or more sensor electrodes in the sensing region 170 can be increased using the techniques described herein, without increasing the number of hardware components (e.g., receiver module 305 components) or increasing the system cost and complexity.

In general, one will note that the signal-to-noise ratio of a detected signal can be improved by increasing the number of samples of the signal that are measured (e.g., filtering to narrow the noise or interference susceptibility bandwidth and/or by increasing the received signal power in the susceptible bandwidth). However, to improve the signal-to-noise ratio of a conventional capacitive sensing process, by increasing the number of samples used to determine the position of an input object, is impractical for a number of reasons. First, for each additional sample taken at each sensor electrode the amount of time taken to detect the position of the sensed input object proportionally increases. For example, if a full scan of all the sensor electrodes 120 in the sensing region 170 takes a first time period (e.g., 5 to 17 msec), and the wish is to increase the number of the samples from a single sample to two samples, then the sensing electrodes will need to be scanned twice, which will take twice the time to detect the position of the input object but may be prohibited if there is a required minimum report rate. Second, since conventional capacitive sensing processes use sequential scanning processing techniques the time it would take to collect and process the data to determine the input object's position, without adjusting the scanning rate, is generally not fast enough to accurately determine the position of a fast moving input object.

Figure 4:
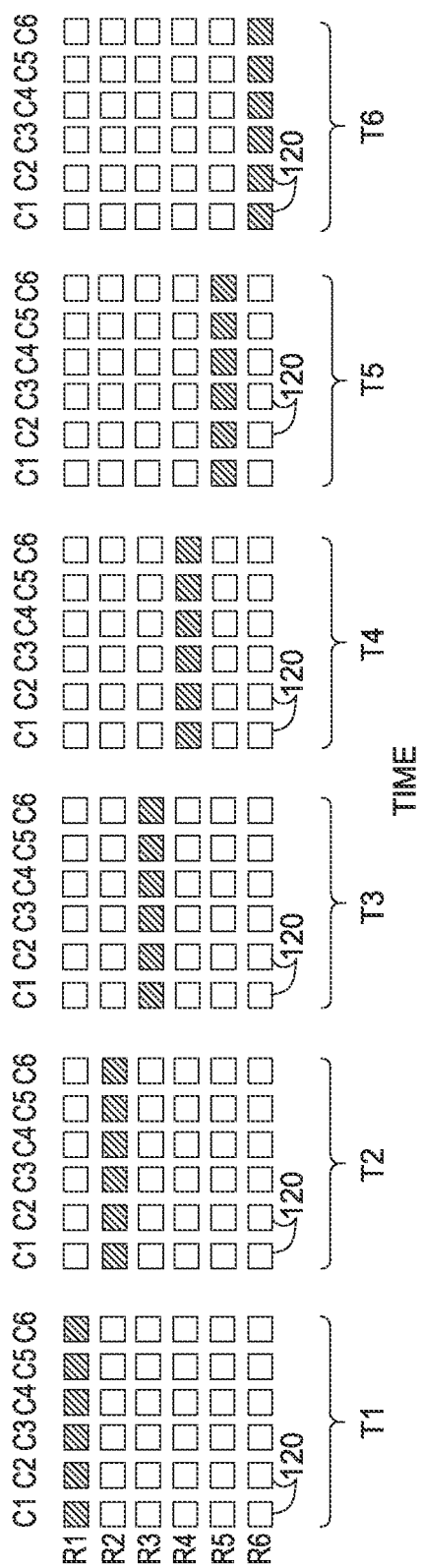
FIG. 4 illustrates a conventional capacitive sensing scanning process performed on an array of sensor electrodes over a number of time intervals.

FIG. 4 illustrates a conventional capacitive sensing process that scans a full-array of sensor electrodes 120 (e.g., 36 sensor electrodes) to form a capacitive image of at least a portion of the sensing region 170. As shown in FIG. 4, the capacitive image is formed by successively scanning rows R1 to R6 of sensor electrodes over the sensing intervals T1-T6, as shown by the hatched sensor electrodes in each row over the time intervals T1 to T6. In one example, the resulting signals of each of the sensor electrodes 120 in the row R1 are separately sensed in time interval T1 (e.g., see hatching in row R1), using components found in the capacitive sensing circuitry. Next, at time interval T2, the resulting signals of each of the sensor electrodes 120 in the row R2 are separately sensed using components found in the capacitive sensing circuitry. The scanning process for each successive row, such as rows R3, R4, R5 and R6, is then performed for each of the successive time intervals T3, T4, T5 and T6, respectively. The scanning process will then cyclically repeat again starting with row R1, and will continue to successively scan each row for as long as the input device 100 desires. In this conventional capacitive sensing process the resulting signal from each individual sensor element 120 is only detected once during one scan cycle of the full-array of sensor electrodes. For example, the resulting signal from the sensor electrode at the position row R1 and column C1 is only sensed during interval T1 of a single cycle of the scanning process. In another example, the sensor electrode at the position row R3 and column C4 is only sensed during interval T3.

However, embodiments of the disclosure generally provide an improved capacitive sensing process by increasing the number of resulting signals that are measured from each sensor electrode during a single cycle of a cyclical scanning process. The scanning process generally includes receiving a composite resulting signal from a plurality of sensor electrodes at each scanning interval and then applying one or processing steps to determine an improved resulting signal for each of the scanned sensor electrodes. The composite resulting signal generally includes the sum of the resulting signals received from multiple sensor electrodes that are connected in a group of sensor electrodes during each time interval. The group of sensor electrodes can be selected and controlled by use of various elements of the processing system 110 including the multiplexor 304 in the receiver modules 305. Thus, the signal-to-noise ratio of a resulting signal determined for each a sensor electrode can be improved, while being performed in the same time frame that is required to perform one scanning cycle of the scanned sensor electrodes. In general (e.g., for white Gaussian noise), signal-to-noise ratio (S/N) can be determined from the following equation(s):

$$\frac{S}{N} = \frac{nS_i}{\sqrt{n\sigma_i^2}} = \sqrt{n}\frac{S_i}{\sigma_i},$$

where "n" is the number of measurements of each sensor electrode, $S_i$ is the resulting signal for each sensor electrode "i" and $\sigma_i$ is the associated error for each measurement for the electrode "i". One will note from these equations that if the signal detection method does not change (e.g., $S_i$ and $\sigma_i$ remain unchanged) the signal-to-noise ratio is improved by a factor of the square root of number of samples taken. Therefore, for example, if four samples are taken during a single scanning cycle versus a single sample, the signal-to-noise ratio will be improved by a factor of two.

The device and scanning and signal processing techniques provided herein include dividing up the full-array of sensor electrodes disposed in the sensing region 170 into smaller arrays of sensor electrodes 120, or also referred to herein as arrays of electrodes, that are sequentially scanned in smaller groups in a desired scanning pattern. The desired scanning pattern will include each receiver module 305 component receiving a composite resulting signal from two or more sensor electrodes in the scanned group at a time. In one example, the array of sensor electrodes includes at least three sensor electrodes, and at least two of the three sensor electrodes are scanned in a group during each sequential scanning interval. In another example, the array of sensor electrodes includes at least four sensor electrodes, and at least two of the four sensor electrodes are scanned during each sequential scanning interval. In one embodiment, the array of sensor electrodes comprises at least four sensor electrodes, and the group of sensor electrodes comprises at least one less sensor electrode than the total number of sensor electrodes in the smaller arrays of sensor electrodes. In another embodiment, the array of sensor electrodes comprises at least four sensor electrodes, and the group of sensor electrodes equals the same number of sensor electrodes found in the array. However, in this case, the resulting signal generated from at least one of the sensors electrodes in the group is altered (e.g. inverted) before it is combined with the resulting signals from the other sensor electrodes in the group to form the composite resulting signal that is subsequently processed by the processing system 110 to determine the position of the input object.

Figure 5A:
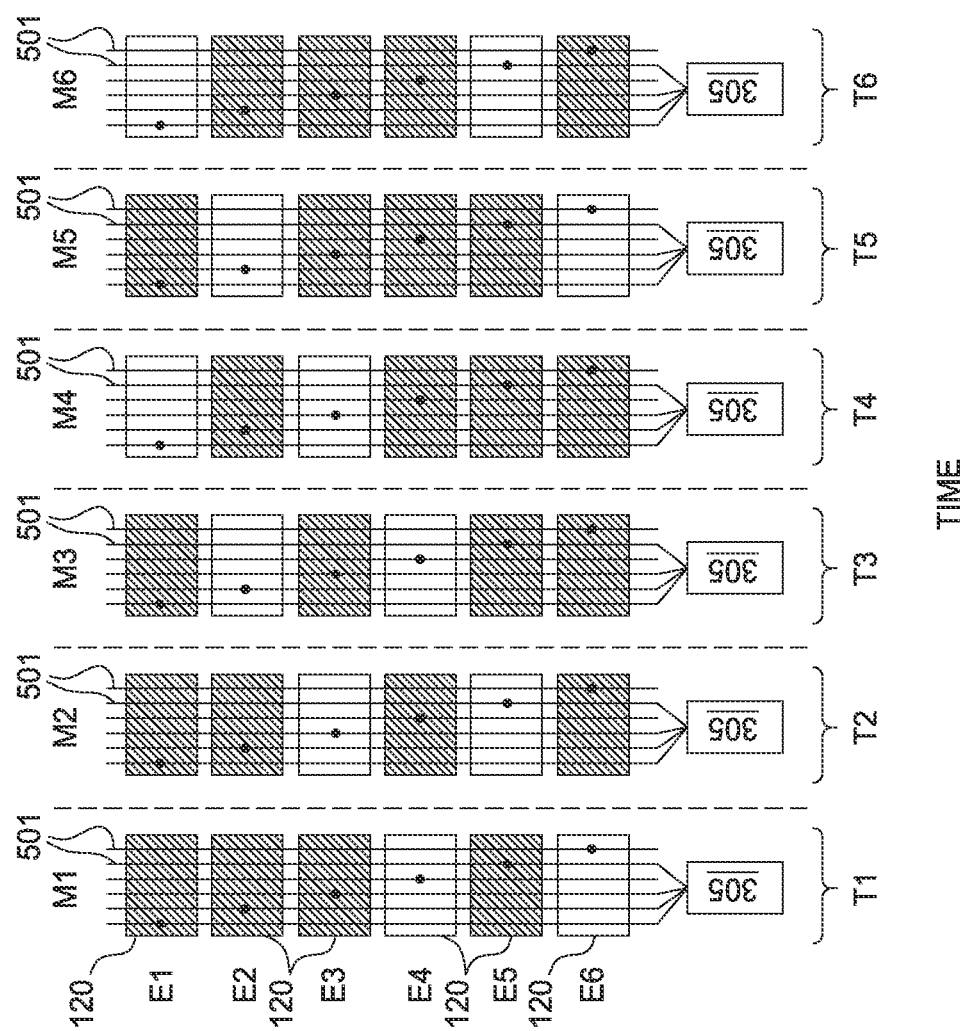
FIG. 5A illustrates a capacitive sensing scanning process performed on a linear array of sensor electrodes over a number of time intervals.

FIG. 5A illustrates a single linear array of sensor electrodes 120 that are aligned in a vertical orientation and are selectively connected to a single receiver module 305 via the traces 501. In this example, the single linear array of six sensor electrodes are scanned using various different groups of sensor electrodes 120 in each of the time intervals T1 to T6. One will note that the scanning process performed during a single cycle will include the sampling of the resulting signal from each sensor electrode E1 to E6 four times. For example, the electrode E2 (e.g., second from the top) is sampled during the time intervals T1, T2, T4 and T6, as illustrated by the hatched boxes, and thus are part of the composite resulting signal measured in these time intervals. One will note that the groups of four sensor electrodes in this example do not repeat within one scanning cycle, which is the time interval starting at T1 and ending at the end of time interval T6.

In general, the scanning process is able to detect the resulting signals that are formed by selecting non-repeating groups of sensor electrodes within an array of sensor electrodes to form a composite resulting signal at each time interval, and thus will satisfy the equation:

$$M = A \cdot E,$$

where M is a matrix containing the measured composite resulting signal values, A is a matrix of the samples taken in each time interval, and E is a matrix containing the individual signals received from each sensor electrode. An example of the matrices equation for the example shown in FIG. 5A is as follows.

Measured Signals $$\begin{bmatrix} M4 \\ M3 \\ M2 \\ M1 \\ M6 \\ M5 \end{bmatrix} = \begin{bmatrix} 0 & 1 & 0 & 1 & 1 & 1 \\ 1 & 0 & 1 & 0 & 1 & 1 \\ 1 & 1 & 0 & 1 & 0 & 1 \\ 1 & 1 & 1 & 0 & 1 & 0 \\ 0 & 1 & 1 & 1 & 0 & 1 \\ 1 & 0 & 1 & 1 & 1 & 0 \end{bmatrix} * \begin{bmatrix} E1 \\ E2 \\ E3 \\ E4 \\ E5 \\ E6 \end{bmatrix}$$

A method to determine the resulting signal from the sensor is finding the inverse matrix of matrix A (or $A^{-1}$) in order to satisfy the equation:

$$E = A^{-1} \cdot M.$$

An example of this matrices equation for the example shown in FIG. 5A is as follows.

Reconstruction $$\begin{bmatrix} E1 \\ E2 \\ E3 \\ E4 \\ E5 \\ E6 \end{bmatrix} = \begin{bmatrix} -3 & 1 & 5 & 1 & -3 & 1 \\ 1 & -3 & 1 & 5 & 1 & -3 \\ -3 & 1 & -3 & 1 & 5 & 1 \\ 1 & -3 & 1 & -3 & 1 & 5 \\ 5 & 1 & -3 & 1 & -3 & 1 \\ 1 & 5 & 1 & -3 & 1 & -3 \end{bmatrix} * \begin{bmatrix} M4 \\ M3 \\ M2 \\ M1 \\ M6 \\ M5 \end{bmatrix} / 8$$

In one embodiment, in order to satisfy and solve this equation, the selected scanning process used to define the sample matrix A needs to generate a sensor electrode scanning pattern that forms a square matrix (or n×n matrix) that is invertible. One will note that a matrix is generally invertible if the determinate of the matrix is non-zero (e.g., det(A)≠0) or otherwise mathematically independent. However, in some embodiments, it may be possible to define a scanning process that uses a non-invertible type of sample matrix A (e.g., pseudo invertible matrix) that yields non-unique solutions when it is "inverted." It may be possible to use this "pseudo invertible matrix" to determine the individual signal matrix E as long as the non-unique solutions do not vary greatly from one to another, and thus the inherent error associated in the calculation of the individual signals is acceptable. In one example, the "pseudo invertible matrix" generating scanning process can be used to correct for an undetermined offset within the individual sampled signals or help in cases where a singular value decomposition (SVD) type of solution is needed. The "pseudo invertible matrix" scanning process may also be useful in cases where the number of samples/measurements exceeds the number of unknowns (e.g., variables), such as a non-square sample matrix.

In the example shown in FIG. 5A, the scanning process includes scanning an array of six electrodes to generate and measure composite resulting signals from groups of four electrodes during each of the six time intervals to form a sample matrix A that is a six by six matrix.

FIG. 5B illustrates a scanning process performed on the same single linear array of sensor electrodes 120 shown in FIG. 5A, but uses a different sampling group size versus the group size discussed above in conjunction with FIG. 5A. In this example, the single linear array of six sensor electrodes are scanned using groups of two sensor electrodes 120 in each of the time intervals T1 to T6. For example, the electrode E2 (e.g., second from the top) is sampled during the time intervals T1 and T2, and thus are part of the composite resulting signal measured in these time intervals. The groups of two sensor electrodes in this example do not need to repeat within one scanning cycle of all the sensor electrodes (i.e. a sensing frame). An example of the matrices equations for the example shown in FIG. 5B are as follows.

Measured Signals $$\begin{bmatrix} M2 \\ M3 \\ M1 \end{bmatrix} = \begin{bmatrix} 0 & 1 & 1 \\ 1 & 0 & 1 \\ 1 & 1 & 0 \end{bmatrix} \times \begin{bmatrix} E1 \\ E2 \\ E3 \end{bmatrix}$$

$$\begin{bmatrix} M5 \\ M6 \\ M4 \end{bmatrix} = \begin{bmatrix} 0 & 1 & 1 \\ 1 & 0 & 1 \\ 1 & 1 & 0 \end{bmatrix} \times \begin{bmatrix} E4 \\ E5 \\ E6 \end{bmatrix}$$

Reconstruction $$\begin{bmatrix} E1 \\ E2 \\ E3 \end{bmatrix} = \begin{bmatrix} -1 & 1 & 1 \\ 1 & -1 & 1 \\ 1 & 1 & -1 \end{bmatrix} \times \begin{bmatrix} M2 \\ M3 \\ M1 \end{bmatrix} \times 1/2$$

$$\begin{bmatrix} E4 \\ E5 \\ E6 \end{bmatrix} = \begin{bmatrix} -1 & 1 & 1 \\ 1 & -1 & 1 \\ 1 & 1 & -1 \end{bmatrix} \times \begin{bmatrix} M5 \\ M6 \\ M4 \end{bmatrix} \times 1/2$$

One will note that the signal-to-noise ratio of the analyzed results reconstructed using the technique illustrated in FIG. 5B will improve the signal-to-noise ratio by a factor of the square root of two (e.g., ~1.4 improvement) versus the potential factor of two improvement seen in the technique described in FIG. 5A over a conventional scanning process.

Figure 6A:
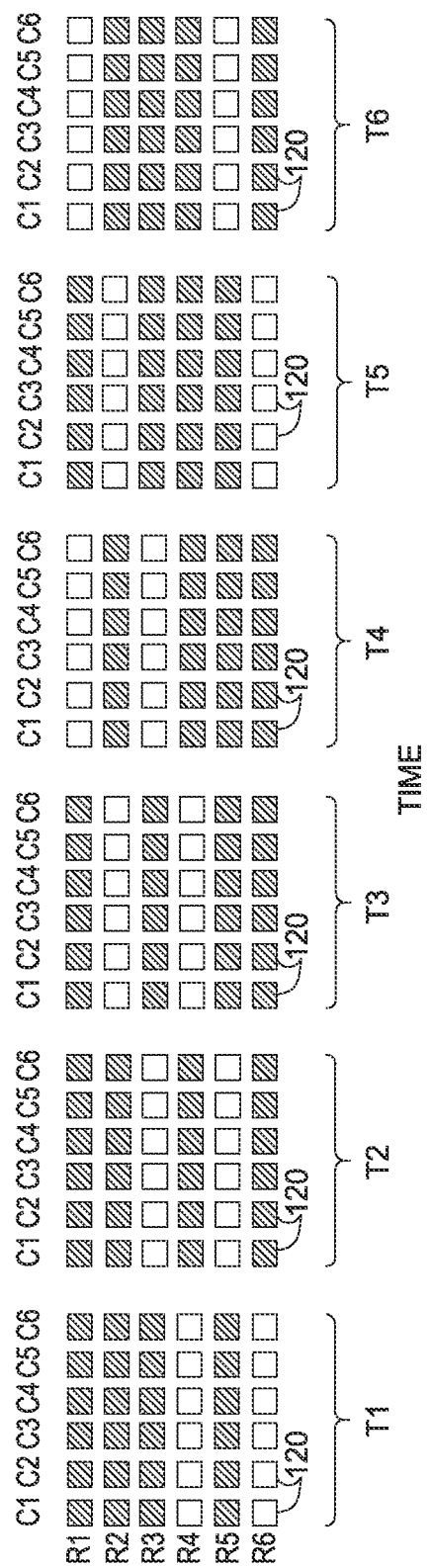
FIG. 6A illustrates a capacitive sensing scanning process performed on an array of sensor electrodes over a number of time intervals.

FIG. 6A illustrates a full-array of sensor electrodes 120 that are positioned in a rectangular array similar to the full-array of sensor electrodes shown in FIG. 4. However, in order to improve the detection of the position of an input object placed over the array of sensor electrodes the improved scanning technique described herein is performed. In this example, the full-array of sensor electrodes are divided into smaller arrays of sensing electrodes so that the detection process can be improved. In this configuration, each set of sensor electrodes in the "smaller array," or small array, includes six sensor electrodes that are aligned in a vertical orientation and are selectively connected to a single receiver module (not shown), as similarly shown and discussed in conjunction with FIG. 5A. In others words, the full-array of sensor electrodes includes six sets of smaller arrays of sensor electrodes that are connected together in a column configuration, such that column C1 includes one small array of sensor electrodes, column C2 includes another small array of sensor electrodes, and so on. In this example, each of six arrays of sensor electrodes are each sequentially scanned using various different groups of sensor electrodes 120 in each of the time intervals T1 to T6. One will note that the scanning process performed during a single cycle will include the sampling of the resulting signals from each sensor electrode in rows R1 to R6 of each of the six arrays of sensing electrodes four times. For example, the electrodes in row R2 (e.g., second from the top) of each of the six arrays of sensor electrodes is sampled during the time intervals T1, T2, T4 and T6, and thus are part of the composite resulting signal separately measured from each of the six small arrays during each time interval.

Figure 6B:
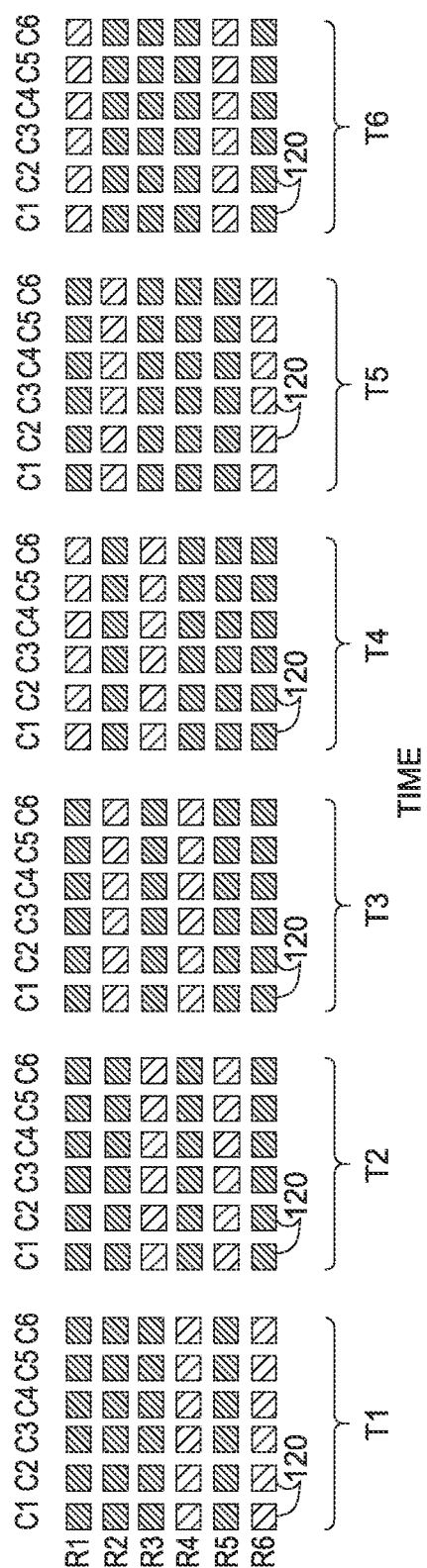
FIG. 6B illustrates another capacitive sensing scanning process performed on an array of sensor electrodes over a number of time intervals.

FIG. 6B illustrates an alternate scanning process that is used to improve the detection of the position of an input object placed over an array of sensor electrodes. In this example, the full-array of sensor electrodes are divided into smaller arrays of sensing electrodes similar to the version of the scanning process shown in FIG. 6A. However, in one embodiment of the scanning process, the group of sensor electrodes that are used to form the composite resulting signal includes the use of all of the sensor electrodes in the small array of sensor electrodes (e.g., six sensor electrodes in each column C1, C2, C3 ... C6). However, in an effort to determine the resulting signal of each sensor electrode in the small array of sensor electrodes using the techniques described herein, some of the individual resulting signals used to form the composite resulting signal for the defined group of sensor electrodes during each time interval are altered prior to their incorporation into the composite resulting signal that is received by the receiver module 305. In one embodiment, some of the resulting signals from one or more of the sensor electrodes in the group are altered by inverting and/or scaling the individual measured resulting signal prior to its incorporation into the composite resulting signal. In some configurations, the alteration process includes the use of current conveyors 310A and 310B that are configured and positioned to separately intercept one or more resulting signals generated by each sensor electrode in the small array before it is combined with the other received resulting signals from the sensor electrodes in the small array. In one example, as shown in FIG. 6B, the processing system 110 causes the current conveyor 310A to invert the signal from two of the sensor electrodes in each group of sensor electrodes during a time interval. For illustration purposes, the sensor electrodes that have their resulting signal inverted in a time interval are illustrated by a "left leaning" crosshatch in FIG. 6B (i.e., rows R4 and R6 at time interval T1) and the sensor electrodes that have their signal un-inverted are illustrated by a "right leaning" crosshatch (i.e., rows R1-R3 and R5 at time interval T1). Similar to the scanning process described above in conjunction with FIG. 6A, each of six arrays of sensor electrodes are sequentially scanned using various different group configurations in each of the time intervals T1 to T6. However, one will note that the scanning process performed during a single scanning cycle (e.g. sensing frame) will include the sampling of the resulting signals from each sensor electrode in rows R1 to R6 in each of the six arrays of sensing electrodes six times, which can improve the signal-to-noise ratio of the calculated resulting signal for each sensor electrode in each small array by a ratio of the square root of six over the square root of four versus the scanning process illustrated in FIG. 6A. For example, the electrodes in row R2 (e.g., second from the top) of each of the six arrays of sensor electrodes is sampled during the time intervals, and thus are part of the composite resulting signal separately measured from each of the six small arrays during each time interval.

An example of the matrices equations for the example shown in FIG. 6B are as follows.

Measured Signals $$\begin{bmatrix} M4 \\ M3 \\ M2 \\ M1 \\ M6 \\ M5 \end{bmatrix} = \begin{bmatrix} -1 & 1 & -1 & 1 & 1 & 1 \\ 1 & -1 & 1 & -1 & 1 & 1 \\ 1 & 1 & -1 & 1 & -1 & 1 \\ 1 & 1 & 1 & -1 & 1 & -1 \\ -1 & 1 & 1 & 1 & -1 & 1 \\ 1 & -1 & 1 & 1 & 1 & -1 \end{bmatrix} \times \begin{bmatrix} E1 \\ E2 \\ E3 \\ E4 \\ E5 \\ E6 \end{bmatrix}$$

Reconstruction $$\begin{bmatrix} E1 \\ E2 \\ E3 \\ E4 \\ E5 \\ E6 \end{bmatrix} = \begin{bmatrix} -1 & 1 & 3 & 1 & -1 & 1 \\ 1 & -1 & 1 & 3 & 1 & -1 \\ -1 & 1 & -1 & 1 & 3 & 1 \\ 1 & -1 & 1 & -1 & 1 & 3 \\ 3 & 1 & -1 & 1 & -1 & 1 \\ 1 & 3 & 1 & -1 & 1 & -1 \end{bmatrix} \times \begin{bmatrix} M4 \\ M3 \\ M2 \\ M1 \\ M6 \\ M5 \end{bmatrix} \times 1/8$$

One will note that the small array of sensor electrodes that are scanned in the scanning process defined herein need not be formed in a linear array, and thus could be formed in any desirable pattern, such as a square array, polar array (e.g. radial), diagonal array, checker-board array or other useful pattern. It is generally desirable, to select the sensor electrode pattern of the small array such that it divides the larger full-array of sensing electrodes in the sensing region 170 into regular non-overlapping arrays that utilize all of the sensor electrodes needed to form the capacitive image. In some embodiments, each of the electrodes in the non-overlapping arrays are coupled in a multiplexing connection configuration, similar to the one shown in FIG. 3A or 3B, that allows each of the electrodes to be joined in groups of a desirable size during the generation of the composite resulting signal during each time interval in the scanning process, as discussed above.

Figure 6C:
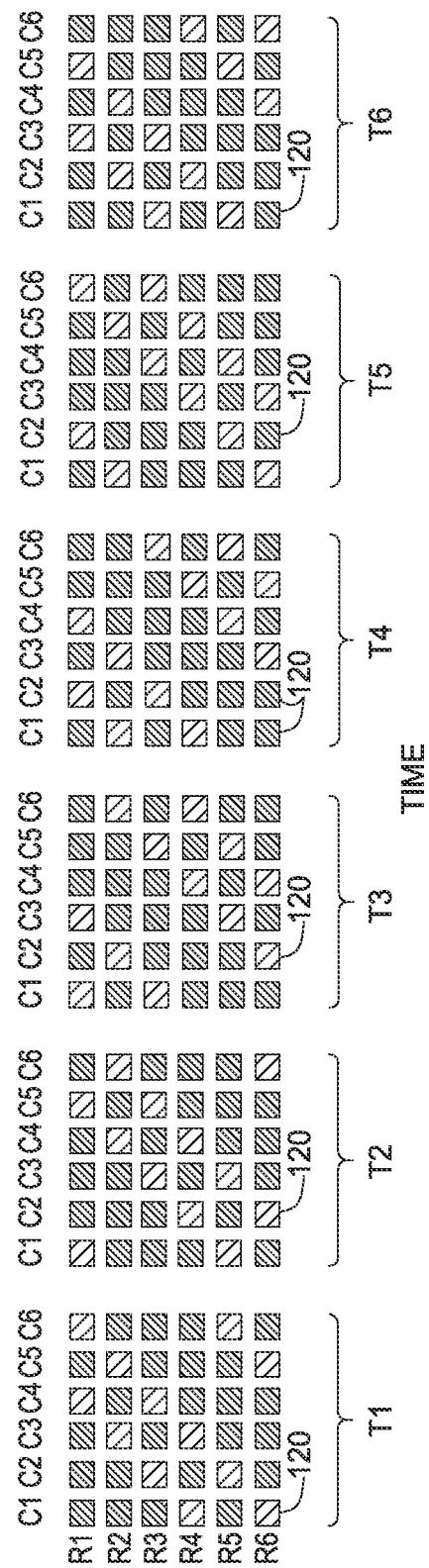
FIG. 6C illustrates another capacitive sensing scanning process performed on an array of sensor electrodes over a number of time intervals.

FIG. 6C illustrates an alternate scanning process that is used to improve the detection of the position of an input object placed over an array of sensor electrodes. In this example, an array of sensor electrodes, similar to the array shown in shown in FIGS. 6A and 6B, is scanned in a spatially irregular pattern, but in a cyclically repeating pattern over time. In this example, small arrays of sensor electrodes in the array of sensor electrodes are used to form composite resulting signals (e.g., six sensor electrodes in each column C1, C2, C3 . . . C6) that are sampled at each time interval (e.g., times T1, T2, T3 . . . T6). In this example, each of six arrays of sensor electrodes are each sequentially scanned using various different irregular groups of sensor electrodes 120 in each of the time intervals T1 to T6. One will note in this example that the scanning process performed during a single sensing cycle will include the sampling of the resulting signals from each sensor electrode in the array of sensing electrodes at least four times. For example, the electrode in row R2 (e.g., second from the top) of the first column C1 is sampled during the time intervals T1, T2, T3 and T6 using an un-inverted signal and an inverted signal during the time intervals T4 and T5, and thus is part of the composite resulting signal measured during each of these time intervals. Therefore, by selecting a scanning pattern that samples each of the electrodes a desired number of times within a cycle, but not necessarily in a spatially uniform manner, the detection of the position of an input object placed over an array of sensor electrodes can be improved using the analysis techniques described herein. Use of this technique may be useful to remove any systematic error created by scanning the array of sensor electrodes in a spatially regular pattern at each time interval. For example the error in position for a user input moving close to the scan velocity (i.e. the touch electrode pitch times the sequential scan rate) may be minimized by choosing an appropriate ordering (permutation) and relative phases of the electrode array receiver demodulation.

Figure 6E:
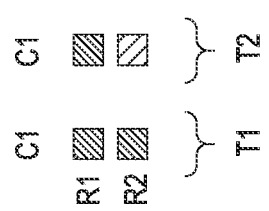
FIG. 6E illustrates another capacitive sensing scanning process performed on an array of sensor electrodes over a number of time intervals.
Figure 6D:
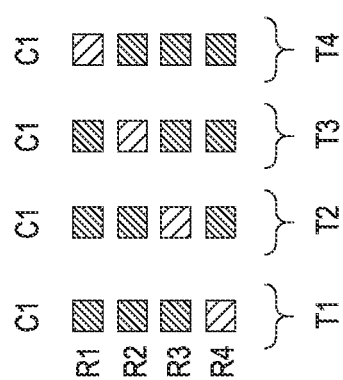
FIG. 6D illustrates another capacitive sensing scanning process performed on an array of sensor electrodes over a number of time intervals.

FIG. 6D illustrates an alternate scanning process that is used to improve the detection of the position of an input object placed over an array of sensor electrodes. In this example, a single linear array of four sensor electrodes are scanned using various different groups of sensor electrodes 120 in each of the time intervals T1 to T4. One will note that the scanning process performed during a single cycle will include the sampling of the resulting signal from each sensor electrode R1 to R4 three or more times. For example, the electrode R2 (e.g., second from the top) has a non-inverted signal provided during the time intervals T1, T2 and T4 and an inverted signal is provided during the time interval T3, as illustrated by the differently hatched boxes. Thus, each signal provided to each of the electrodes will be part of a composite resulting signal measured in each of these time intervals. Therefore, the scanning pattern used to on this type of sensor electrode configuration can also be used to improve the detection of the position of an input object placed over an array of sensor electrodes using the analysis techniques described herein.

FIG. 6E illustrates another alternate scanning process that is used to improve the detection of the position of an input object placed over an array of sensor electrodes. In this example, a single linear array of two sensor electrodes is scanned during two different time intervals T1 and T2. One will note that the scanning process performed during a single cycle will include the sampling of the resulting signal from each sensor electrode in rows R1 to R2 one or more times. For example, the electrode R2 has a non-inverted signal provided during the time intervals T1 and an inverted signal provided during the time intervals T2, as illustrated by the differently hatched boxes. Thus, each signal provided to each of the electrodes will be part of a composite resulting signal measured using the two sensor electrodes R1 and R2 in each of these time intervals. Therefore, similar to the other configurations discussed above, the scanning process used to on this type of sensor electrode configuration can also be used to improve the detection of the position of an input object placed over an array of sensor electrodes using the analysis techniques described herein.

While the scanning processes shown in FIGS. 6A-6E each illustrate a scanning process that includes the sensors electrodes being in one of two states during each time interval (e.g., either un-inverted resulting signal and no signal is provided, or un-inverted resulting signal and inverted resulting signal), these illustrated scanning processes are not intended to limit the scope of the disclosure provided herein, since any of the scanning processes described herein can utilize any one of the three possible resulting signal states (e.g., inverted, non-inverted and "no signal provided" sensor electrode states) at one or more of the sensor electrodes at each different time interval within the scanning cycle to detect the position of an input object placed over the array of sensor electrodes.

Figure 7:
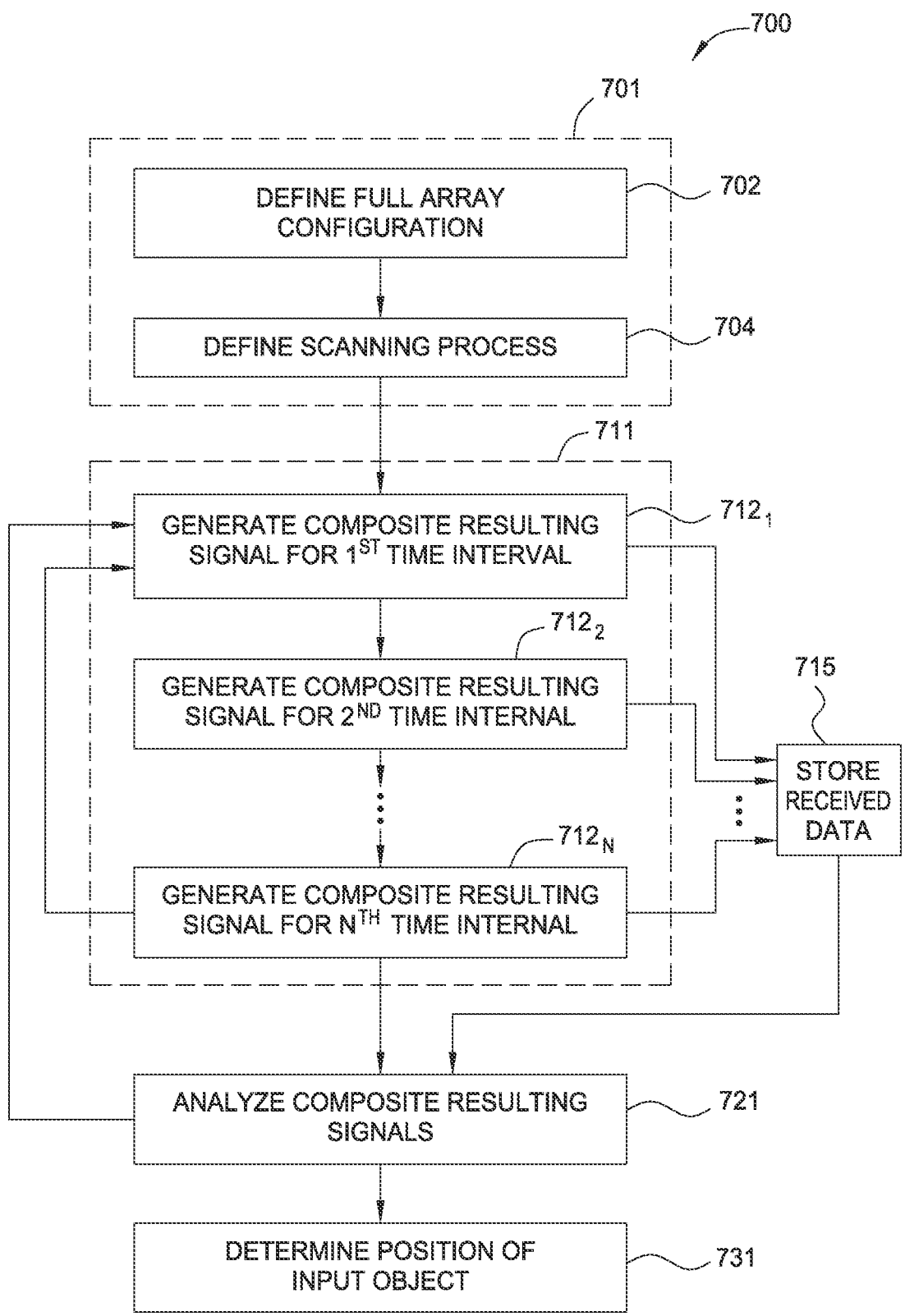
FIG. 7 illustrates series of method steps used to perform a scanning process an array of sensor electrodes.

FIG. 7 illustrates a detection process 700 used to scan a full-array of sensor electrodes to more accurately detect the position of an input object 140 over the full-array of sensor electrodes, according to one embodiment of the disclosure. However, the detection process may be performed on a subset of all the sensing elements 120 comprising a subset of the sensing region 170. The array of sensor electrodes may be columns, rows, blocks, or distributed with an even or varying density across the sensing region 170 (e.g., checker board or pseudorandom distribution). Different arrays within the sensing region 170 composed of different sensor electrodes 120 may use different multiplexing configuration, excitations, inverting and scaling of the electrode signals such that processing of the measured resulting signals allow for reconstruction of multiple independent measurements at different sensing electrodes with improved signal-to-noise ratio. In addition, different sensor areas may be measured with different carrier frequencies and/or of different phases (e.g., I/Q, sine/cosine). In some embodiments, the carrier frequency and any modulation thereof (e.g., amplitude, phase, etc.) may be constant during a scanning cycle. The process 700 begins with a scanning process configuration 701 step that is used to define how a scanning process 711 is to be subsequently performed on the sensor electrode configuration defined in step 701. The scanning process configuration 701 step generally includes a process of defining the full-array sensor electrode pattern (i.e., step 702) and defining a scanning process to be performed (i.e., step 704) using the defined full-array of sensor electrodes.

Step 702 generally includes a process of defining and/or laying out a full-array of sensor electrodes in a pattern within the sensing region 170, such that the formed full-array of sensor electrodes can be equally divided up into smaller arrays of sensor electrodes that are each scanned during the scanning process performed in step 711. As briefly discussed above, in some embodiments, the pattern of the full-array of sensor electrodes generally requires that the full-array be divided up into non-overlapping smaller arrays of sensor electrodes that utilize all of the sensor electrodes needed to form a capacitive image during a single scanning cycle of the scanning process. The smaller array configuration is typically defined such that the performed scanning process is able to collect a desirable number of composite resulting signal samples to improve the signal-to-noise ratio of the results obtained from the process 700, as defined by the equations discussed above. In some embodiments, the smaller arrays are defined, and/or the processing system 110 is configured, to allow the sensor electrodes in each of the smaller arrays of sensor electrodes to be sampled in groups and deliver the generated composite resulting signal from each of the sampled groups to a receiver module 305. The smaller array of sensor electrodes includes a desired number of sensor electrodes to allow all of sensor electrodes to be sampled the same number of times during a scanning cycle (e.g. 711) of the scanning process. For example, referring back to FIGS. 5A and 6A, the smaller array of sensor electrodes includes six sensor electrodes, which enable a composite resulting signal to be generated using four sensor electrodes that are connected in different groups at each time interval to equally sample the output from each sensor electrode four times during the six time interval scanning cycle. In another example, referring back to FIG. 6B, the smaller array of sensor electrodes includes six sensor electrodes, which enable a composite resulting signal to be generated using six sensor electrodes that are connected in different groups at each time interval to equally sample the output from each sensor electrode six times during the six time interval scanning cycle.

Next, at step 704, a scanning process sequence, or scanning process, is defined so that the output from each sensor electrode in the full-array of sensor electrodes can be measured a plurality of times and filtered (e.g. averaged and/or decimated) to improve the signal-to-noise ratio of the detected signals received from each sensor electrode. During step 704 a desired number of sensor electrodes that are to be connected in groups during a scanning cycle are defined to assure that each sensor electrode is sampled the same number of times during a single scanning cycle (e.g. 711) of the scanning process. During step 704 the sample (e.g. multiplexor and/or signal scaling) matrix A and a reconstruction (e.g. inverse) sample matrix $A^{-1}$ are selected for the scanning process defined during the scanning process configuration 701, where the sample matrix A scanning pattern is performed during each time interval in the scanning process. As noted above, it is generally preferred that the sample matrix A be invertible, and thus the determinate of the sample matrix A will generally be non-zero (e.g., $\det(A) \neq 0$).

Once the input device 100 has been formed using the input received during step 701, and the scanning process has been defined, coded and prepared for use by the processing system 110 the scanning process 711 can be performed. The scanning process 711 generally includes the generation of composite resulting signals that are generated by the connected groups of sensor electrodes 120 in at least one of the smaller arrays of sensor electrodes within the full-array during each time interval of the scanning process 711.

The scanning process 711 starts with step $712_1$ that includes the generation of a composite resulting signal from at least a first group of sensor electrodes within one of the arrays of sensor electrodes defined within the full-array of sensor electrodes. The generation of the composite resulting signal will generally include a multiplexor 304 selecting the desired sensor electrodes in the first group to allow components in the processing system 110 to drive the selected sensor electrodes 120 so that the first composite resulting signal can be detected by a receiver module 305. The received first composite resulting signal may then be stored in memory (i.e., step 715) within the processing system 110.

The scanning process 711 may then continues to step $712_2$, which includes the generation of a second composite resulting signal from at least a second group of sensor electrodes within one of the arrays of sensor electrodes. The generation of the second composite resulting signal will generally include a multiplexor 304 selecting the desired sensor electrodes in a second group to allow components in the processing system 110 to drive the selected sensor electrodes 120 so that the second composite resulting signal can be detected by the connected receiver module 305. The received second composite resulting signal may then be stored in memory (i.e., step 715) within the processing system 110.

The scanning process 711 will then continue on until the last of the groups of sensor electrodes in a cycle of the defined scanning process are used to generate of a composite resulting signal (e.g., step $712_n$). After the last composite resulting signal has been generated, and optionally stored in memory, the scanning process may start over again at step $712_1$.

One will note that scanning process 711 defined in the detection process 700 may form part of a larger scanning process used to form a capacitive image using all of the full-array of sensor electrodes 120 in the sensing region 170. The scanning process 711 may be performed on multiple smaller arrays of sensor electrodes 120 in a parallel fashion, in a serial fashion, or a combination of both a serial and parallel fashion. In other words, the scanning process 711 may be performed on two or more of the smaller arrays of sensor electrodes 120 at the same time, as discussed in conjunction with the example illustrated in FIG. 6A, and/or the scanning process 711 may performed on at least two of the smaller arrays of sensor electrodes 120 in a serial fashion (e.g., one scanning process 701 doesn't start until the other one ends). One will note that the scanning process 711, which is used on one smaller array of sensor electrodes 120, may only form a part of the complete scanning cycle performed on the sensor electrodes 120 found in sensing region 170 to form a capacitive image for determining input object information (e.g position).

Next, at step 721, the generated composite resulting signals are analyzed to determine an improved resulting signal for each sensor electrode in the smaller array of sensor electrodes, and ultimately by all of the sensor electrodes in the sensing region 170. The processes performed during step 721 will include the analysis of the generated composite resulting signals received, within one cycle of the scanning process 711. The analysis process performed during step 721 will include the analysis of an inverse matrix (i.e., matrix $A^{-1}$) created for the scanning process 711, during the scanning process configuration 701 step. Alternately, in some embodiments, the analysis process performed during step 721 will include the analysis of a "pseudo inverse matrix" created for the scanning process 711, during the scanning process configuration 701 step. Also, in some embodiments, the process performed in step 721 will include the matrix multiplication of the composite resulting signals (i.e., matrix M) and inverse sample matrix $A^{-1}$ (or pseudo inverse matrix) divided by a normalization factor. The processes performed during step 721 are completed for all the scanned small arrays of sensor electrodes within the sensing region 170 to determine an improved resulting signal for all of the sensor electrodes in the sensing region 170. While the last improved resulting signal is being determined, or after the last resulting signal has been determined, the scanning process may continue on at the start of the process (step $712_1$). The results obtained during step 721 may be optionally stored in memory for later use or may be used in real time.

Next, at step 731, the analyzed (i.e. reconstructed) results determined during step 721 are then used by the processing system 110 to determine the input objects position in the sensing region 170. In some embodiment, the sensor electrode matrix E created for each of the smaller arrays of sensor electrodes are compared, merged or joined together to form a capacitive image of the complete sensing region 170 (or a subset of sensing region 170), so that the capacitance of each sensing electrode in that sensing region obtained during step 721 can be used to determine the position of the input object.

Additionally, in some embodiments, the scanning process 711 includes the use of a coded capacitive sensing signal that is provided to one or more of the sensor electrodes 120 to further improve the signal to noise ratio (S/N) and thus improve the accuracy and/or repeatability of the determination of the position of an input object. This process may be useful when an integrated display and array of sensor electrodes 120 are being updated in parallel. In one embodiment, processing system 110 synchronizes a frequency of the encoded capacitive sensing signal used to perform capacitive sensing (e.g., absolute capacitance sensing or transcapacitive sensing) to the line rate used to update an integrated display. In one embodiment, the capacitance sensing signal includes a plurality of sensing cycles that each contain two half cycles. The half cycles may be synchronized to the line rate used when updating the display. For example, the time period of the half cycle may be an integer multiple of the time period used to perform a line update. For example, the time period of the half cycle may be four times longer than the time period of the line update or vice versa.

The processing system 110 may phase align the capacitance sensing signal to one or more periodic noise events generated by the display signals. In this case, the capacitance sensing signal may be aligned with the source driver outputs such that the charge share event, source line enable, and/or gate line driving may align with the reset period in the demodulated capacitance sensing signal. Notably, because the noise event (e.g., the charge share event, source line enable, and/or gate line driving) typically falls within the reset period, any noise from this event is not recorded in the sampled demodulated capacitance sensing signal. In such embodiments, the beginning and the end of the reset times are at a stable voltage. Nonetheless, other phase alignments are possible and still mitigate or prevent the noise event from affecting capacitive sensing. In one example, the noise may be mitigated so long as the noise event consistently falls within the same period of the demodulation signal.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A method of detecting the position of an input object within a sensing region of an input device, comprising:
   generating a first composite resulting signal, wherein the first composite resulting signal comprises a first sum of capacitive sensing measurements received from two or more sensor electrodes in a first scanned group of sensor electrodes in an array of sensor electrodes;

generating a second composite resulting signal, wherein the second composite resulting signal comprises a second sum of capacitive sensing measurements received from two or more sensor electrodes in a second scanned group of sensor electrodes in the array of sensor electrodes, wherein the two or more sensor electrodes in the first scanned group and the two or more sensor electrodes in the second scanned group have at least one sensor electrode in common; and analyzing the first composite resulting signal and the second composite resulting signal to determine a resulting signal value from each of the sensor electrodes in the first scanned group and the second scanned group.

2. The method of claim 1, wherein the generated first composite resulting signal and the generated second composite resulting signal are formed using an absolute sensing type capacitive sensing technique.

3. The method of claim 1, wherein the array of sensor electrodes is one of a plurality of arrays of sensors electrodes that form at least part of a sensing region of the input device.

4. The method of claim 3, wherein each of the arrays of sensors electrodes in the plurality of arrays of sensors electrodes include the same number of sensor electrodes.

5. The method of claim 1, wherein analyzing the first composite resulting signal and the second composite resulting signal comprises:
inserting the first and second composite resulting signals into a measurement matrix; and
multiplying the measurement matrix times an inverted sample matrix, wherein the inverted sample matrix comprises a sampling pattern used to create the first scanned group and a sampling pattern used to create the second scanned group.

6. The method of claim 1, wherein the array of sensor electrodes comprises at least three sensor electrodes, and the first scanned group and the second scanned group comprise at least one less sensor electrode than the total number of sensor electrodes in the array of sensor electrodes.

7. The method of claim 1, further comprising:
forming a capacitive image during one scanning cycle of a sensing region of the input device, wherein the scanning cycle comprises a plurality of sequential and equal time intervals of a scanning sequence,
wherein the generated first composite resulting signal and the generated second composite resulting signal are each formed during the plurality of sequential and equal time intervals.

8. The method of claim 1, wherein the first composite resulting signal and the second composite signal are generated by a multiplexor assembly.

9. The method of claim 8, wherein the generated first composite resulting signal and the generated second composite resulting signal are each formed during one sequential and equal time interval.

10. A method of detecting the position of an input object within a sensing region of an input device, comprising:
calculating a resulting signal for each sensor electrode in a first array of sensor electrodes, wherein calculating the resulting signal comprises:
generating a first composite resulting signal, wherein the first composite resulting signal comprises a first sum of capacitive sensing measurements received from two or more sensor electrodes in a first scanned group of sensor electrodes in the first array of sensor electrodes;
generating a second composite resulting signal, wherein the second composite resulting signal comprises a second sum of capacitive sensing measurements received from two or more sensor electrodes in a second scanned group of sensor electrodes in the first array of sensor electrodes, wherein the two or more sensor electrodes in the first scanned group and the two or more sensor electrodes in the second scanned group have at least one sensor electrode in common; and
analyzing the first composite resulting signal and the second composite resulting signal to determine a resulting signal value from each of the sensor electrodes in the first scanned group and the second scanned group;
calculating a resulting signal for each sensor electrode in a second array of sensor electrodes, wherein calculating the resulting signal comprises:
generating a third composite resulting signal, wherein the third composite resulting signal comprises a third sum of capacitive sensing measurements received from two or more sensor electrodes in a third scanned group of sensor electrodes in the second array of sensor electrodes;
generating a fourth composite resulting signal, wherein the fourth composite resulting signal comprises a fourth sum of capacitive sensing measurements received from two or more sensor electrodes in a fourth scanned group of sensor electrodes in the second array of sensor electrodes; and
analyzing the third composite resulting signal and the fourth composite resulting signal to determine a resulting signal value from each of the two or more sensor electrodes in the second array of sensor electrodes; and
combining the calculated resulting signal for each sensor electrode in the first array and the second array to form at least part of a capacitive image of the sensing region of the input device.

11. The method of claim 10, wherein the generated first, second, third and fourth composite resulting signals are formed using an absolute sensing type capacitive sensing technique.

12. The method of claim 10, wherein the first and second arrays of sensor electrodes are two of a plurality of arrays of sensors electrodes that form the sensing region of the input device.

13. The method of claim 12, wherein each of the arrays of sensors electrodes in the plurality of arrays of sensors electrodes include the same number of sensor electrodes.

14. The method of claim 10, wherein analyzing the first composite resulting signal and the second composite resulting signal comprises:
inserting the first and second composite resulting signals into a measurement matrix; and
multiplying the measurement matrix times an inverted sample matrix, wherein the inverted sample matrix comprises a sampling pattern used to create the first scanned group and a sampling pattern used to create the second scanned group.

15. The method of claim 10, wherein the first and the second arrays of sensor electrodes comprise at least four sensor electrodes, and the first, second, third and fourth scanned groups comprise at least one less sensor electrode than the total number of sensor electrodes in the first and the second arrays of sensor electrodes.

16. An input device, comprising:

a processing system; and a non-transitory memory having stored therein a number of instructions which, when executed by the processing system, causes the processing system to perform operations comprising:

generating a first composite resulting signal, wherein the first composite resulting signal comprises a first sum of capacitive sensing measurements received from two or more sensor electrodes in a first scanned group of sensor electrodes in an array of sensor electrodes;

generating a second composite resulting signal, wherein the second composite resulting signal comprises a second sum of capacitive sensing measurements received from two or more sensor electrodes in a second scanned group of sensor electrodes in the array of sensor electrodes, wherein the two or more sensor electrodes in the first scanned group and the two or more sensor electrodes in the second scanned group have at least one sensor electrode in common; and analyzing the first composite resulting signal and the second composite resulting signal to determine a resulting signal value from each of the sensor electrodes in the first scanned group and the second scanned group.

17. The input device of claim 16, wherein the generated first composite resulting signal and the generated second composite resulting signal are formed using an absolute sensing type capacitive sensing technique.

18. The input device of claim 16, wherein the array of sensor electrodes is one of a plurality of arrays of sensors electrodes that form a sensing region of the input device.

19. The input device of claim 18, wherein each of the arrays of sensors electrodes in the plurality of arrays of sensors electrodes includes the same number of sensor electrodes.

20. The input device of claim 16, wherein analyzing the first composite resulting signal and the second composite resulting signal comprises:

inserting the first and second composite resulting signals into a measurement matrix; and multiplying the measurement matrix times an inverted sample matrix, wherein the inverted sample matrix comprises a sampling pattern used to create the first scanned group and a sampling pattern used to create the second scanned group.

21. The input device of claim 16, wherein the array of sensor electrodes comprises at least four sensor electrodes, and the first scanned group and the second scanned group comprise at least one less sensor electrode than the total number of sensor electrodes in the array of sensor electrodes.

* * * * *